United States Patent
Fang et al.

(10) Patent No.: US 12,095,088 B2
(45) Date of Patent: Sep. 17, 2024

(54) PREPATATION METHOD AND PREPATATION DEVICE OF LITHIUM-ION BATTERY ELECTRODE

(71) Applicants: Tsinghua University, Beijing (CN); HON HAI PRECISION INDUSTRY CO., LTD., New Taipei (TW)

(72) Inventors: Zhen-Han Fang, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 171 days.

(21) Appl. No.: 17/505,810

(22) Filed: Oct. 20, 2021

(65) Prior Publication Data

US 2023/0030408 A1 Feb. 2, 2023

(30) Foreign Application Priority Data

Jul. 27, 2021 (CN) .......................... 202110852904.7

(51) Int. Cl.

| | |
|---|---|
| *H01M 4/583* | (2010.01) |
| *H01M 4/02* | (2006.01) |
| *H01M 4/04* | (2006.01) |
| *H01M 4/36* | (2006.01) |
| *H01M 4/505* | (2010.01) |
| *H01M 4/525* | (2010.01) |

(Continued)

(52) U.S. Cl.
CPC ......... *H01M 4/583* (2013.01); *H01M 4/0419* (2013.01); *H01M 4/364* (2013.01); *H01M 4/505* (2013.01); *H01M 4/525* (2013.01); *H01M 10/0404* (2013.01); *H01M 10/0525* (2013.01); *H01M 2004/027* (2013.01); *H01M 2004/028* (2013.01)

(58) Field of Classification Search
CPC ... H01M 4/04; H01M 4/0404; H01M 10/0404
See application file for complete search history.

(56) References Cited

U.S. PATENT DOCUMENTS

| | | | | |
|---|---|---|---|---|
| 2002/0127351 A1* | 9/2002 | Takikawa | ............... | B82Y 30/00 428/408 |
| 2023/0021255 A1* | 1/2023 | Jamadar | .................. | H01M 4/04 |

FOREIGN PATENT DOCUMENTS

| | | | | |
|---|---|---|---|---|
| CN | 103886932 | | 6/2014 | |
| CN | 104904034 | | 9/2015 | |
| CN | 105336913 A | * | 2/2016 | ............. H01M 4/04 |

(Continued)

OTHER PUBLICATIONS

CN-105336913-A English machine translation (Year: 2023).*

*Primary Examiner* — Ula C Ruddock
*Assistant Examiner* — Armindo Carvalho, Jr.
(74) *Attorney, Agent, or Firm* — ScienBiziP, P.C.

(57) ABSTRACT

A method of preparing a lithium-ion battery electrode, S1, preparing a carbon nanotube raw material; S2, providing an electrode active material and a solvent; S3, mixing the carbon nanotube raw material and the electrode active material with the solvent to form a mixture, and stirring the mixture to form an electrode mixture; and S4, spraying the electrode mixture on a substrate to form an electrode layer, and removing the substrate and drying the electrode layer to form the lithium-ion battery electrode.

10 Claims, 14 Drawing Sheets

(51) Int. Cl.
*H01M 10/04* (2006.01)
*H01M 10/0525* (2010.01)

(56) References Cited

FOREIGN PATENT DOCUMENTS

| | | |
|---|---|---|
| JP | 2017502449 | 1/2017 |
| JP | 2020031045 | 2/2020 |
| JP | 2020119664 | 8/2020 |

\* cited by examiner

PREPATATION METHOD AND PREPATATION DEVICE OF LITHIUM-ION BATTERY ELECTRODE

CROSS-REFERENCE TO RELATED APPLICATIONS

This application claims all benefits accruing under 35 U.S.C. § 119 from China Patent Application No. 202110852904.7, filed on Jul. 27, 2021, in the China National Intellectual Property Administration, the contents of which are hereby incorporated by reference.

FIELD

The present disclosure relates to a preparation method and a preparation device of lithium-ion battery electrode.

BACKGROUND

A lithium-ion battery energy storage is widely used in fields such as mobile electronics, electric transportation, and power storage. With an increasing demand for high-endurance electric vehicles, large-scale industrial energy storage, smart grid and other high-energy storage devices, an energy density of lithium-ion batteries also urgently needs to be improved. Taking a conventional lithium-ion battery as an example, an active material, a conductive agent, a binder, and a current collector together form a positive electrode or a negative electrode. However, the conductive agent, the binder and the current collector in the positive electrode or the negative electrode are inactive materials and cannot provide capacity. Therefore, reducing a content of the inactive materials as much as possible can effectively increase the energy density of the lithium-ion battery, such as preparing electrodes with high active material areal loading to reduce the mass ratio of the current collector.

The active material can be uniformly distributed in a low areal loading electrode. However, when increasing the areal loading of the active material in the electrode, it is necessary to improve the conductive agent and the binder at the same time. Otherwise the active material cannot be uniformly distributed. When the areal loading increased, micro-sized cracks appear on a surface of the electrode. This is because as the thickness of the electrode increases, the inhomogeneity of the electrode intensifies, resulting in non-uniform local bonding effect and non-uniform surface tension distribution. The micro-sized cracks will also lead to increase an electrolyte consumption and decrease a structural stability of the lithium-ion battery.

BRIEF DESCRIPTION OF THE DRAWINGS

Implementations of the present technology will now be described, by way of example only, with reference to the attached figures.

DETAILED DESCRIPTION

Figure 1:
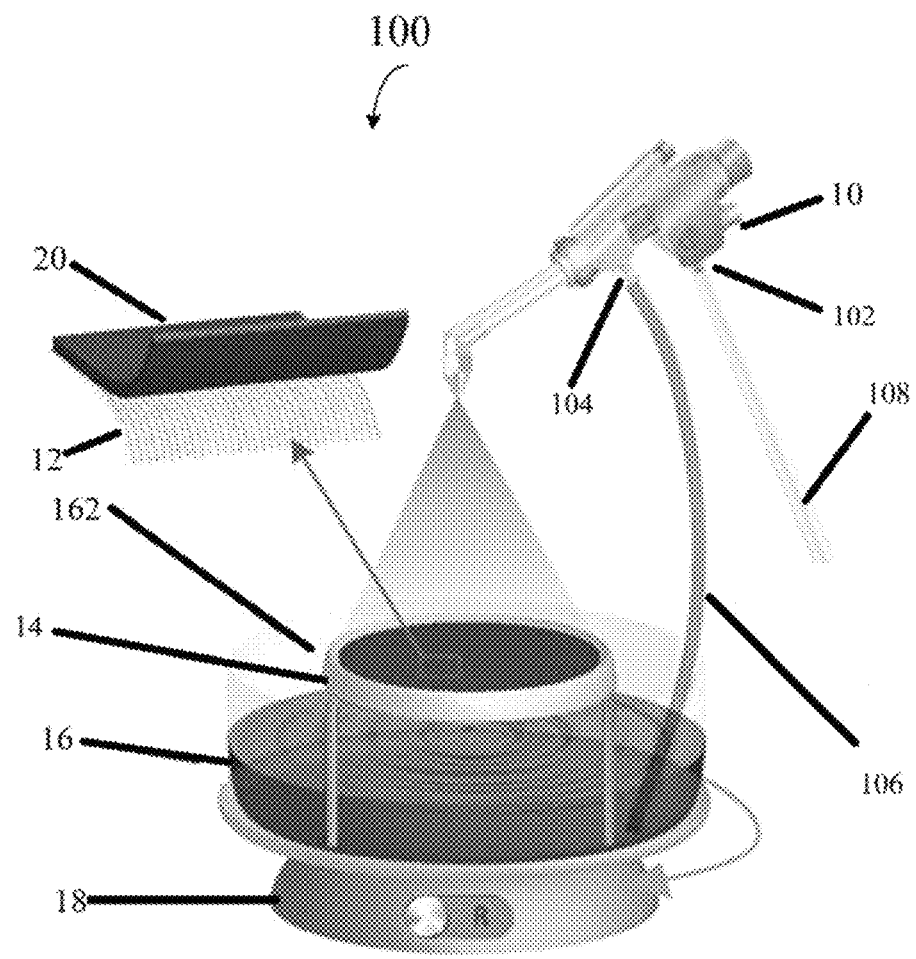
FIG. 1 is a schematic view of a lithium-ion battery electrode preparation device.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts can be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Referring to FIG. 1, one embodiment of an a lithium-ion battery electrode preparation device 100 of is provided. The lithium-ion battery electrode preparation device 100 comprises a rotating device 18, a recycling device 16, a substrate 12, and a spray gun 10. The rotating device 18 rotates around its axis of rotation when it works. The recycling device 16 is fixed on the rotating device 18. The substrate 12 is fixed inside the recycling device 16. The spray gun 10 is located above the substrate 12 for spraying an electrode mixture on the substrate 12.

The substrate 12 is used to carry the electrode mixture. The substrate 12 can be a solid planar structure. A material of the substrate 12 can be polymers such as polytetrafluoroethylene, polyethylene, metals such as aluminum and copper, glass plates, and the like. The substrate 12 can also be a grid structure, for example, a stainless steel filter screen, a molecular sieve, and the like. In one embodiment, the substrate 12 is the stainless steel filter screen with a mesh number of 1000 meshes.

The substrate 12 is fixed inside the recycling device 16. Furthermore, the substrate 12 can be fixed inside the recycling device 16 through a support 14. The support 14 is used to carry the substrate 12. The support 14 is located on the recycling device 16. Specifically, the support 14 comprises a main body and at least one supporting column. The main body of the support 14 is used to carry the substrate 12. The substrate 12 is located on the main body of the support 14. In one embodiment, the main body of the supporting body 14 comprises a groove structure, and the substrate 12 is disposed in the groove. In another embodiment, the main body of the support 14 is a hollow frame, the substrate 12 is located on the hollow frame, and at least a apart of the substrate 12 is suspended inside of the recycling device 16. The area of the substrate 12 is smaller than the cross-sectional area of the recycling device 16. The support 14 is fixed on the recycling device 16 by the at least one supporting column. In this embodiment, the support 14 comprises three supporting columns. The support column of the support body 14 can be fixed on the outer surface of the recycling device 16 or the inner surface of the recycling device 16, as long as it is ensured that the substrate 12 is located inside the recycling device 16. A manner in which the support column of the support body 14 is fixed on the recycling device 16 is not limited, and the support column can be fixed on the recycling device 16 by a snap method, or can be fixed on the recycling device 16 by an adhesive.

The substrate 12 comprises a first surface and a second surface opposite to the first surface. The first surface is located on the support 14. A height of the second surface of the substrate 12 is lower than a height of the recycling device 16, and the first surface of the substrate 12 is higher than a height of the electrode mixture carried in the recycling device 16. Therefore, the electrode mixture that has not been sprayed on the substrate 12 can be better recycled. In this embodiment, the supporting body 14 comprises on main body and three supporting columns. The supporting columns are fixed on the outer surface of the recycling device 16 by the adhesive. The main body is the hollow frame. The stainless steel filter screen is located on the hollow frame, and at least a apart of the stainless steel filter screen is suspended by the hollow frame.

The recycling device 16 is fixed on the rotating device 18 for carrying the electrode mixture. The recycling device 16 is supported by the rotating device 18 and rotates with the rotation of the rotating device 18. The recycling device 16 comprises a groove 162. The substrate 12 and at least a part of the support 14 are located in the groove 162. The groove 162 is used to carry the electrode mixture. A material of the recycling device 16 is not limited, as long as it can carry the electrode mixture. A size and shape of the recycling device 16 can be selected according to actual needs. In this embodiment, the material of the recycling device 16 is glass, and the recycling device 16 has a cylindrical structure.

The rotating device 18 is used to support and fix the recycling device 16 so that the recycling device 16 rotates with the rotation of the rotating device 18 and further makes the substrate 12 rotate together. When the rotating device 18 rotates, a position of the spray gun 10 does not change. A shape and a material of the rotating device 18 are not limited, as long as it can drive the recycling device 16 to rotate. In this embodiment, the rotating device 18 is a turntable.

The spray gun 10 is used to spray the electrode mixture onto the substrate 12. The spray gun 10 comprises an air inlet 102 and a liquid inlet 104. The liquid inlet 104 is connected to end of a liquid pipe 106, and the other end of the liquid pipe 106 is located in the groove 162 to contact the electrode mixture. The liquid pipe 106 is used to provide the electrode mixture to the spray gun 10 so that the electrode mixture can be recycling used. The air inlet 102 is connected to an air pipe 108 for providing compressed air to the spray gun 10.

The lithium-ion battery electrode preparation device 100 provided by the present invention has the following advantages: the preparation of the lithium-ion battery electrode by spraying the electrode mixture with a spray gun can ensure an uniformity of the electrode mixture and form a lithium-ion battery electrode with uniformly distributed active materials. At the same time, the lithium-ion battery electrode preparation device 100 realizes a recycling of the electrode mixture, which can save electrode materials, and improve an efficiency of manufacturing lithium-ion battery electrodes.

Figure 2:
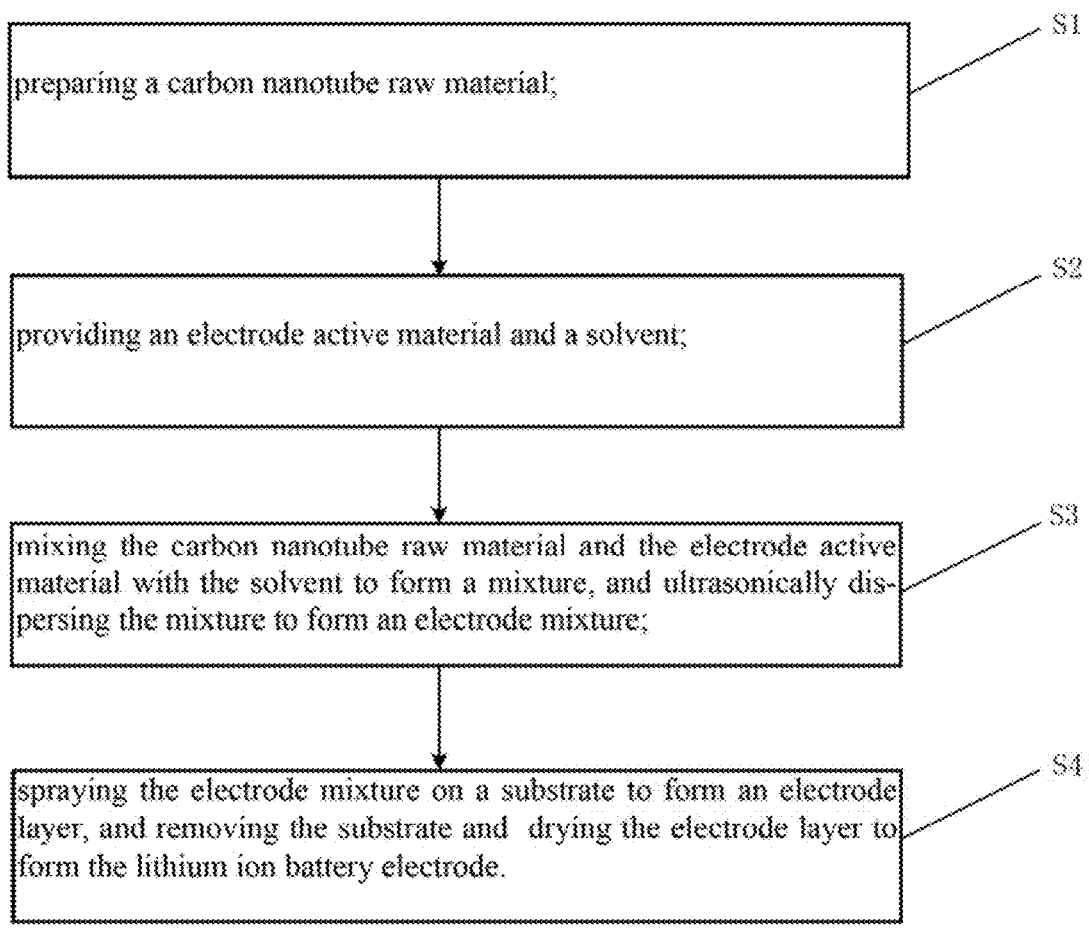
FIG. 2 is a flowchart of a method for making a lithium-ion battery electrode.

FIG. 2 illustrates a method of one embodiment of preparing a lithium-ion battery electrode, the method comprises:

S1, preparing a carbon nanotube raw material;
S2, providing an electrode active material and a solvent;
S3, mixing the carbon nanotube raw material and the electrode active material with the solvent, and ultrasonically dispersing to form an electrode mixture; and
S4, spraying the electrode mixture on a substrate to form an electrode layer, and removing the substrate. Drying the electrode layer to form a lithium-ion battery electrode In step S1, the carbon nanotube raw material consists of a plurality of carbon nanotubes. The plurality of carbon nanotubes can be single-wall carbon nanotubes, double-wall carbon nanotubes or multi-wall carbon nanotubes. A diameter of the plurality of carbon nanotubes ranges from 1 nanometer to 200 nanometers. A length of the plurality of carbon nanotubes is greater than 100 microns. In one embodiment, the length of the plurality of carbon nanotubes is greater than 300 microns. The length of the plurality of carbon nanotubes can be equal or unequal. Preferably, the lengths of the plurality of carbon nanotubes are equal. The plurality of carbon nanotubes are pure carbon nanotubes without impurities. The preparation method of the carbon nanotube raw material has following substeps: growing a carbon nanotube array on a substrate; scraping the carbon nanotube array from the substrate to obtain the carbon nanotube raw material. The carbon nanotube raw material is directly obtained from the carbon nanotube array, the lithium-ion battery electrode prepared by using the carbon nanotube raw material has greater strength. In one embodiment, the carbon nanotube array is a super aligned carbon nanotube array. The super aligned carbon nanotube array means that the length of the plurality of carbon nanotubes in the carbon nanotube array is relatively long, generally greater than 300 microns. The surface of the plurality of carbon nanotubes is pure and without impurities, such as amorphous carbon or residual catalyst metal particles, and a extension direction of the plurality of carbon nanotubes is basically the same. The method of making the carbon nanotube array is not limited, and can be a chemical vapor deposition method, an arc discharge preparation method, or an aerosol preparation method.

In step S2, the active material of the lithium-ion battery electrode can be a lithium-ion battery positive electrode active material or a lithium-ion battery negative electrode active material. Specifically, when preparing the positive electrode of the lithium-ion battery, the positive electrode active material of the lithium-ion battery is used; when preparing the negative electrode of the lithium-ion battery, the negative electrode active material of the lithium-ion battery is used.

The positive electrode active material can be one of lithium iron phosphate ($LiFePO_4$), lithium nickel cobalt ($LiNi_{0.8}Co_{0.2}O_2$), lithium cobalt oxide ($LiCoO_2$), lithium nickel oxide ($LiNiO_2$), lithium cobalt phosphate ($LiCoPO_4$), lithium manganate ($LiMn_2O_4$), LiNi0.8Co0.15Al0.05O2 (NCA), lithium nickel cobalt manganese ($LiNi_xCo_yMn_zO_2$) (where a ratio of x:y:z can be 1:1:1, 5:3:2, 8:1:1 or 9:0.5:0.5) or a combination of them.

The negative electrode active material can be one of graphite, lithium titanate, silicon monoxide, silicon dioxide, silicon, nano-alloys or a combination of them.

The solvent can be one of ethanol, ethylene glycol, propanol, isopropanol, acetone, water or a combination of them. In one embodiment, the solvent is a volatile and non-toxic solvent. In this embodiment, ethanol is used as the organic solvent. When the solvent is a volatile and low-toxic solvent, the solvent can be directly evaporated without additional processing technology, so the preparation method is simple.

In step S3, the order of mixing the carbon nanotube raw material, the electrode active material, and the solvent is not limited. In this embodiment, after the carbon nanotube raw material and the electrode active material are added to a container, an appropriate amount of ethanol is added.

A mass ratio of the carbon nanotube raw material to a total mass of the carbon nanotubes and the active material is ranged from about 0.1 wt % to about 20 wt %, preferably 1% to 10%, and can be 3%, 5%, or 10%.

A power of the ultrasound is ranged from about 400 watts to about 1500 watts. In one embodiment, the power of the ultrasound is ranged from about 800 watts to about 1000 watts. The time of ultrasonic vibration is ranged from about 2 minutes to about 30 minutes. In one embodiment, the time of ultrasonic vibration is ranged from about 5 minutes to about 10 minutes. After ultrasonic vibration, the carbon nanotube raw material and the electrode active material are uniformly mixed to form the electrode mixture.

In step S4, the spray gun 10 is used to spray the electrode mixture on the substrate 12 and dry the electrode mixture to form a lithium-ion battery electrode 20. Referring to FIG. 1 again, in this step, the lithium-ion battery electrode preparation device 100 is used to prepare the lithium-ion battery electrode 20.

The method for making the lithium-ion battery electrode 20 by using the lithium-ion-battery electrode preparation device 100 comprises:

S41, placing the electrode mixture in the recycling device 16;

S42, placing the liquid pipe 106 in the recycling device 16 and fixing the spray gun;

S43, rotating the rotating device 18 to drive the substrate 12 to rotate, and spraying an electrode mixture on a surface of the substrate 12 to form an electrode layer by the spray gun 10; and S44, drying the electrode layer and removing the substrate to obtain a lithium-ion battery electrode.

In step S41, the electrode mixture obtained in step S3 is placed in the groove 162 of the recycling device 16.

In step S42, the liquid pipe 106 is placed in and in directly contact with the electrode mixture in the groove 162 in order to provide the electrode mixture to the spray gun 10. The spray gun 10 is fixed in a positon so that a nozzle of the spray gun 10 is perpendicular to the substrate 12, and a gun distance is ranged from about 5 cm to about 30 cm. The gun distance refers to a distance between the nozzle and the surface of the substrate. In this embodiment, the gun distance is about 20 cm.

In step S43, the rotating device 18 is activated to rotate the rotating device 18 and drive the substrate 12 to rotate, compressed air is introduced to the spray gun 10 through the air pipe 108, and the spray gun 10 is activated to spray the electrode mixture on the surface of the substrate 12. When the rotating device 18 rotates, the position of the spray gun 10 does not change. A rotation speed of the rotating device 18 is ranged form about 10 r/min to about 200 r/min. In this embodiment, the rotating device 18 is a turntable, and the rotation speed of the turntable is about 50 r/min. An air consumption of the spray gun 10 is ranged from about 50 L/min to about 250 L/min. In this embodiment, the air consumption of the spray gun 10 is 225 L/min. An air pressure of the spray gun 10 is ranged from about 0.2 MPa to about 0.5 MPa. In this embodiment, the air pressure of the spray gun 10 is about 0.25 MPa. A spray volume of the electrode mixture is ranged about 85 mL/min to about 210 mL/min. In this embodiment, the spray volume of the electrode mixture is about 170 mL/min. A spray width of the spray gun 10 is ranged from about 100 mm to about 200 mm. In this embodiment, the spray width of the spray gun 10 is about 175 mm.

In step S44, after the electrode mixture in the recycling device 16 is clarified, the spraying is stopped, and the solvent in the electrode layer is evaporated. After the electrode layer is completely dried, the electrode layer is removed from the substrate 12 to obtain the lithium-ion battery electrode. A thickness of the lithium-ion battery electrode can be prepared according to actual needs. In this embodiment, the thickness of the lithium-ion battery electrode is about 100 microns. Further, a cutting step can be included to cut the lithium-ion battery electrode into a required size of the lithium-ion battery. For example, a ring knife or a blade can be used to cut the lithium-ion battery electrode into required round or square electrode for battery assembly.

The method for preparing lithium-ion battery electrodes provided by the present invention has the following beneficial effects: using a spray gun to directly spray the electrode mixture on the substrate can ensure the uniformity of the electrode mixture, so that the electrode active material and the carbon nanotubes have the same sedimentation rate, the uniform lithium-ion battery electrode can be formed. Comparing to the conventional lithium-ion battery electrode, the lithium-ion battery electrodes provided by the present invention can effectively avoid a generation of electrode micro-sized cracks under a same high loading. The recycling device greatly reduces the loss of electrode active materials, which is beneficial to improve a cycle performance of lithium-ion batteries. The preparation method of the lithium-ion battery electrode does not need to add a binder. Therefore, the lithium-ion battery electrode only consists of a lithium-ion battery electrode active material and carbon nanotubes, and the mass ratio of lithium-ion battery electrode active material is relatively high. Since there is no barrier between the active materials of the lithium-ion battery electrode, the conductivity of the lithium-ion battery electrode can be improved. The preparation method of the lithium-ion battery electrode provided by the present invention is simple in operation and has low cost.

Example 1

0.2 g of super-aligned carbon nanotubes and 1 g of lithium iron phosphate (LFP) powders are ultrasonically dispersed in 600 mL of ethanol for 30 minutes to obtain an electrode mixture. The obtained electrode mixture is sprayed on a 1000-mesh filter screen through a spray gun, and the free-standing lithium-ion battery positive electrode is removed from the filter screen after drying the electrode mixture.

Comparative Example 1

An active material lithium iron phosphate, a conductive agent super-p (conductive carbon black) and the binder (PVDF) are mixed in a mass ratio of 8:1:1, and dispersed in the NMP solvent to obtain a slurry. The positive electrode of the lithium-ion battery is formed by coating the slurry on the metal current collector (Al) and drying.

Figure 3:
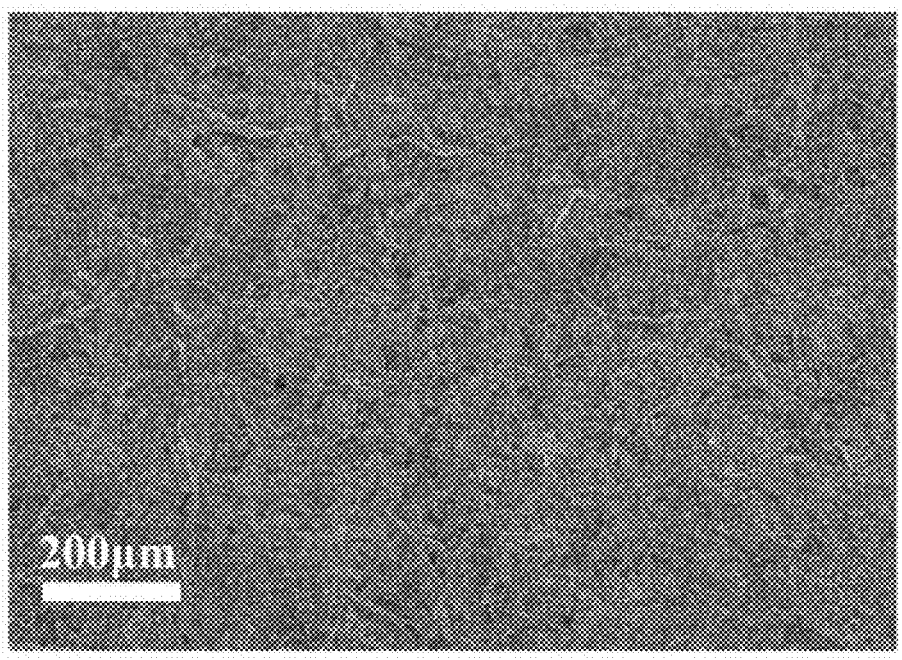
FIG. 3 is a scanning electron microscope (SEM) image of one embodiment of a positive electrode of the lithium-ion battery of Example 1.
Figure 4A:
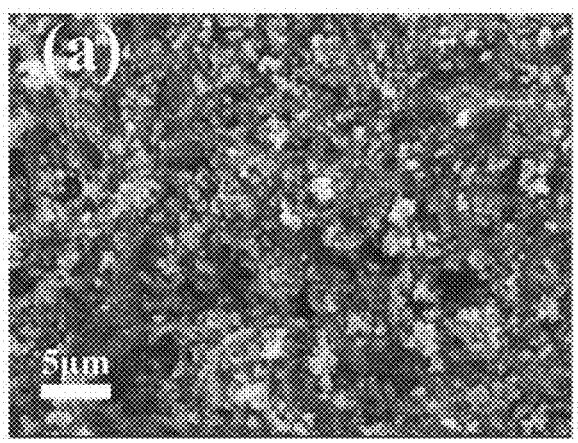
FIG. 4A is the SEM image of another embodiment of the positive electrode of the lithium-ion battery of Example 1.
Figure 4B:
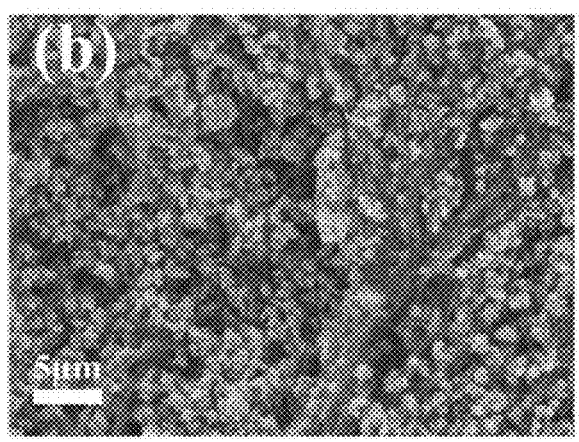
FIG. 4B is the SEM image of another embodiment of the positive electrode of the lithium-ion battery of Example 1.
Figure 5A:
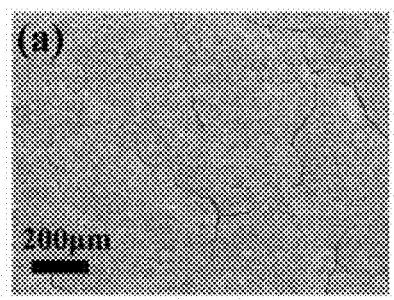
FIG. 5A is the SEM image of another embodiment of a positive electrode of the lithium-ion battery of Comparative Example 1.
Figure 5B:
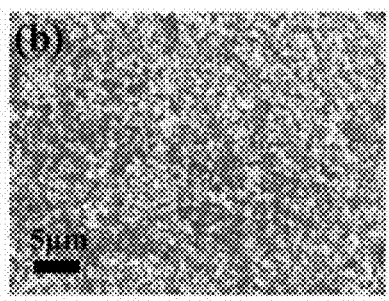
FIG. 5B is the SEM image of another embodiment of a positive electrode of the lithium-ion battery of Comparative Example 1.
Figure 5C:
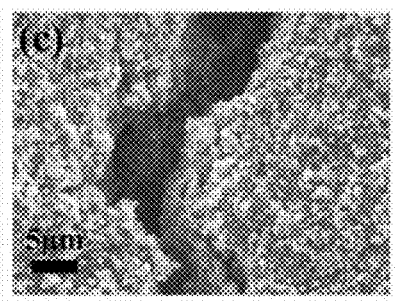
FIG. 5C is the SEM image of another embodiment of a positive electrode of the lithium-ion battery of Comparative Example 1.

FIG. 3 and FIG. 4 are SEM photographs of the positive electrode of the lithium-ion battery of Example 1. FIG. 5 is an SEM photograph of the positive electrode of the lithium-ion battery in Comparative Example 1. Referring FIG. 3 to FIG. 5, lithium iron phosphate in the positive electrode of the lithium-ion battery of Example 1 and the lithium iron phosphate in the positive electrode of the lithium-ion battery of Comparative Example 1 have the same high areal loading, specifically, the areal loading is about 10 mg/cm$^2$. As shown in FIG. 3, the lithium iron phosphate on the surface of the positive electrode of the lithium-ion battery of Example 1 is uniformly distributed and has no micro-sized cracks. As shown in FIG. 4A and FIG. 4b, it can be seen from the SEM photos of the front and back sides of the positive electrode of Example 1 that the positive electrode of the lithium-ion battery of Example 1 has excellent uniformity. As shown in FIG. 5A, FIG. 5B and FIG. 5C, the surface of the positive electrode of the lithium-ion battery of Comparative Example 1 has micro-sized cracks, and the lithium iron phosphate is not uniformly distributed. Compared with the positive electrode of Comparative Example 1, under the same high areal loading, the positive electrode of Example 1 benefits from an excellent network structure of a carbon nanotube film, which can effectively avoid a generation of micro cracks. At the same time, the spraying method can ensure the uniformity of the electrode mixture, thereby ensuring the uniformity of the lithium iron phosphate distribution in the positive electrode of the lithium-ion battery.

Figure 6:
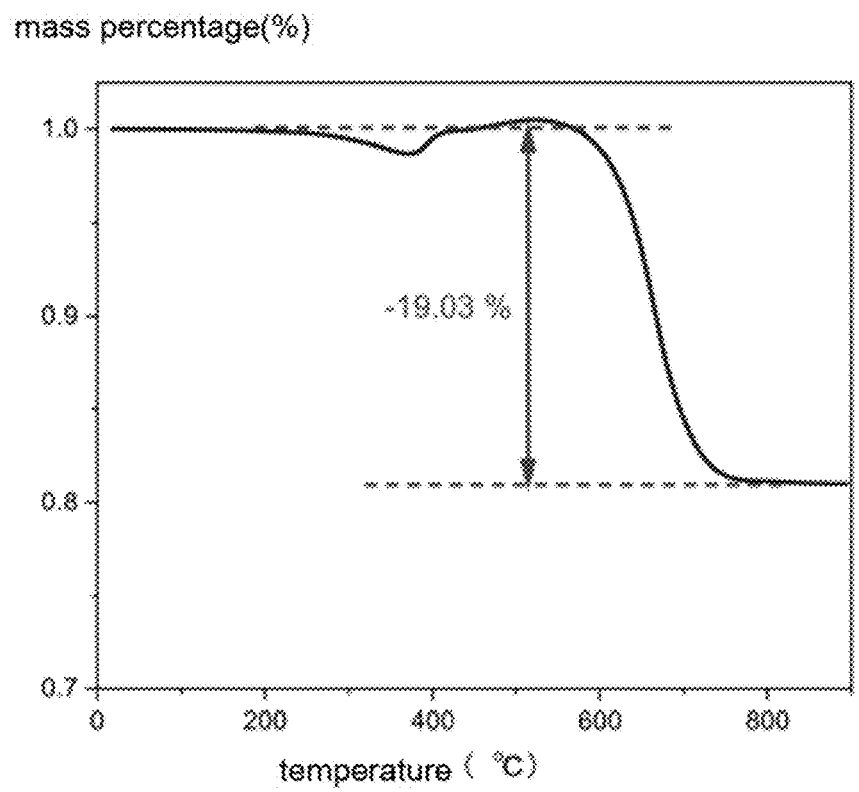
FIG. 6 is a thermogravimetric analysis (TGA) graph of the positive electrode of the lithium-ion battery of Example 1 in an air atmosphere.

FIG. 6 is a thermogravimetric analysis (TGA) curve diagram of the positive electrode of the lithium-ion battery of Example 1 in an air atmosphere. The content of lithium iron phosphate in the positive electrode of the lithium-ion battery of Example 1 can be determined from FIG. 6. As shown in FIG. 6, in an air atmosphere at temperature ranged from about 600° C. to about 700° C., the positive electrode of the lithium-ion battery has a significant 19.03% weight loss, which corresponds to a decomposition of carbon nanotubes in this temperature range. A quality of the positive electrode of the lithium-ion battery tends to be stable when the temperature is greater than 750° C. Therefore, the content of lithium iron phosphate can be determined to be 80.97%. The mass ratio for the preparation of the positive electrode of the lithium-ion battery of Example 1 is clearly described in the Example 1, and a theoretical content of lithium iron phosphate in the positive electrode of the lithium-ion battery of Example 1 is 83.33%. It can be seen that a loss of active material lithium iron phosphate is greatly reduced through the recycling device.

Example 2

The positive electrode of the lithium-ion battery of Example 1 is used as the positive electrode, a polypropylene film is used as a separator, a lithium foil is used as a negative electrode. The positive electrode, the separator, the negative electrode and a stainless steel gaskets are assembled with CR2016 battery shells to form a button cell. 1M LiPF6 in FEC:FEMC:HFE (2:6:2 by mass percentage) is used as an electrolyte. The button cell is assembled in a glove box under an argon atmosphere.

Comparative Example 2

A structure of a button battery of Comparative Example 2 is basically the same as that of the button battery of Example 1, except that the positive electrode of the lithium-ion battery of Comparative Example 1 is used as the positive electrode.

Figure 7:
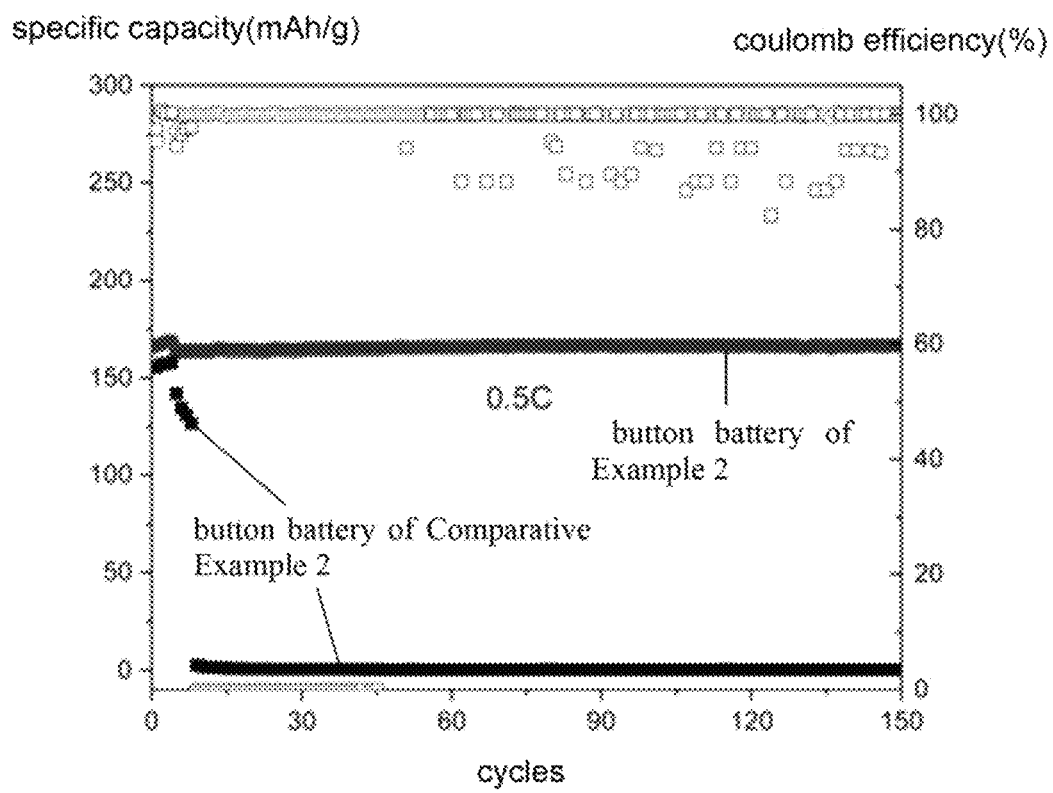
FIG. 7 is a performance comparison graph of a button battery of Example 2 and the button battery of Comparative Example 2 at a rate of 0.5 C.

FIG. 7 is a performance comparison diagram of the button battery of Example 2 and Comparative Example 2 at a rate of 0.5 C. As shown in FIG. 7, an initial specific capacity of the button battery of Example 2 at 0.5 C is 168.4 mAh/g, and it still maintains 166.5 mAh/g after 150 cycles, corresponding to a capacity retention rate of 98.87% and an average coulomb efficiency of 99.9924%. An initial specific capacity of the button battery of Comparative Example 2 is only 157.4 mAh/g at 0.5 C, and rapidly decays in subsequent cycles, and almost no capacity is released after 6 cycles. It can be seen that the performance of the button battery of Example 2 is significantly better than that of the button battery of Comparative Example 2.

Figure 8:
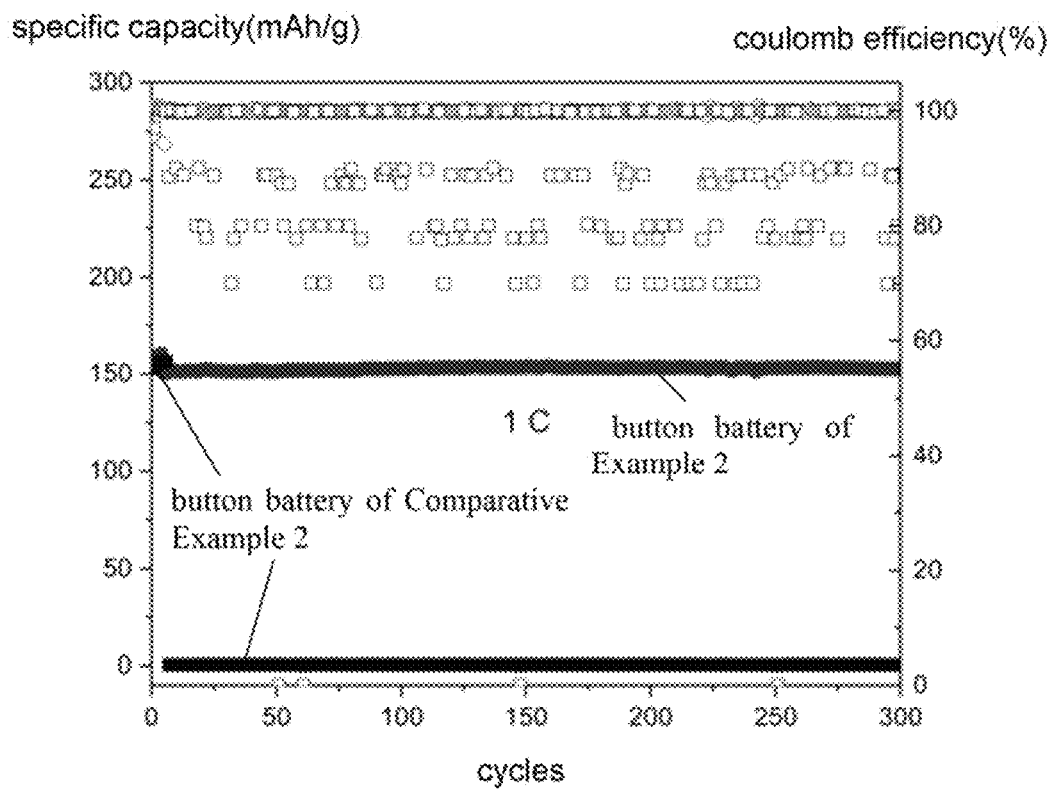
FIG. 8 is the performance comparison graph of the button battery of Example 2 and the button battery of Comparative Example 2 at a rate of 1 C.

FIG. 8 is a performance comparison diagram of the button battery of Example 2 and Comparative Example 2 at a rate of 1 C. As shown in FIG. 8, the button battery of Example 2 has an initial specific capacity of 160.1 mAh/g at 1 C, and still maintains 152.7 mAh/g after 300 cycles, corresponding to a capacity retention rate of 95.38% and an average coulomb efficiency 99.9842%. The button battery of Comparative Example 2 has no cycle capacity at 1 C.

Figure 9:
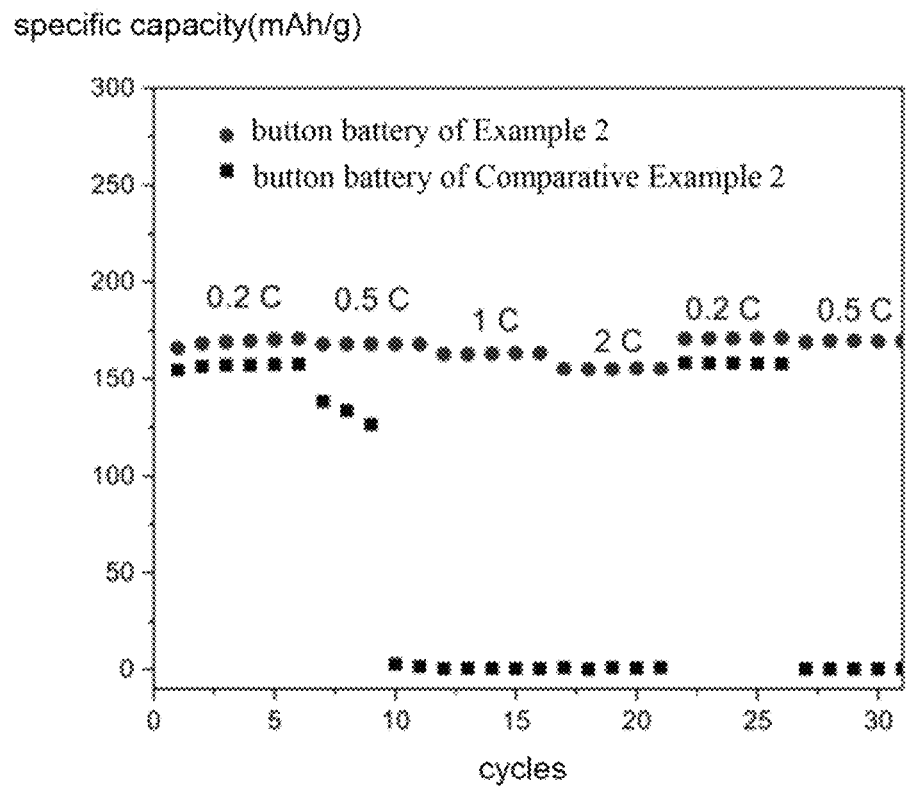
FIG. 9 is a rate comparison graph of the button battery of Example 2 and the button battery of Comparative Example 2.

FIG. 9 is a comparison diagram of a rate performance of the button battery of Example 2 and Comparative Example 2. Two batteries are cycled at a rate of 0.2 C, 0.5 C, 1 C and 2 C respectively, and then switched back to 0.2 C and 0.5 C to explore a reversibility of their electrodes. As shown in FIG. 9, a specific capacity of the button cell of Example 2 at 0.2 C, 0.5 C, 1 C and 2 C are 170.9 mAh/g, 168.1 mAh/g, 163.3 mAh/g, 155.2 mAh/g respectively. When a current density is switched to 0.2 C and 0.5 C, the specific capacities are 170.9 mAh/g and 169.2 mAh/g respectively, which are almost the same as the specific capacities at these two rates before, demonstrating excellent electrode reversibility. The button cell of Comparative Example 2 exhibits a specific capacity of 157.7 mAh/g at 0.2 C. When the current increases to 0.5 C, the initial specific capacity is 138.2 mAh/g, and it decays rapidly. There is no specific capacity at 1 C, 2 C and at the end of the cycle of 0.5 C. When the current is increased to 0.2 C again, the specific capacity is restored to 158.5 mAh/g, but after it is increased to 0.5 C again, there is still no specific capacity. The above performance proves that the button battery of Comparative Example 2 can only work normally at a very low rate, which means that its internal electron transfer and ion transmission are extremely poor, and the button battery of Example 2 can significantly improve these problem.

Figure 10:
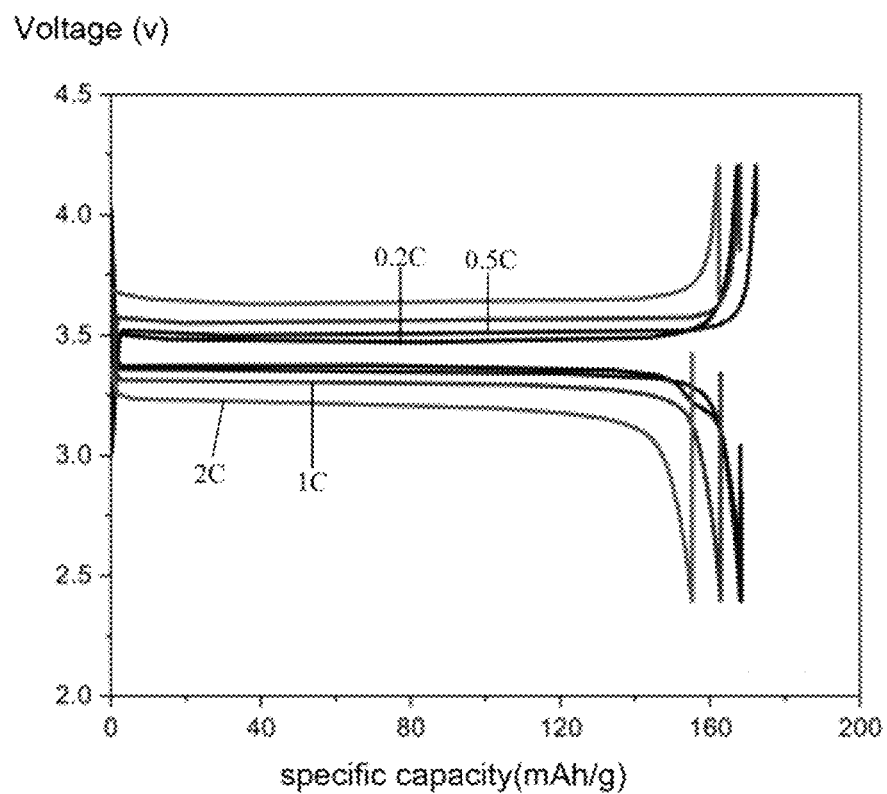
FIG. 10 is a capacity-voltage graph of the positive electrode of the lithium-ion battery of Example 1 under different rates.
Figure 11:
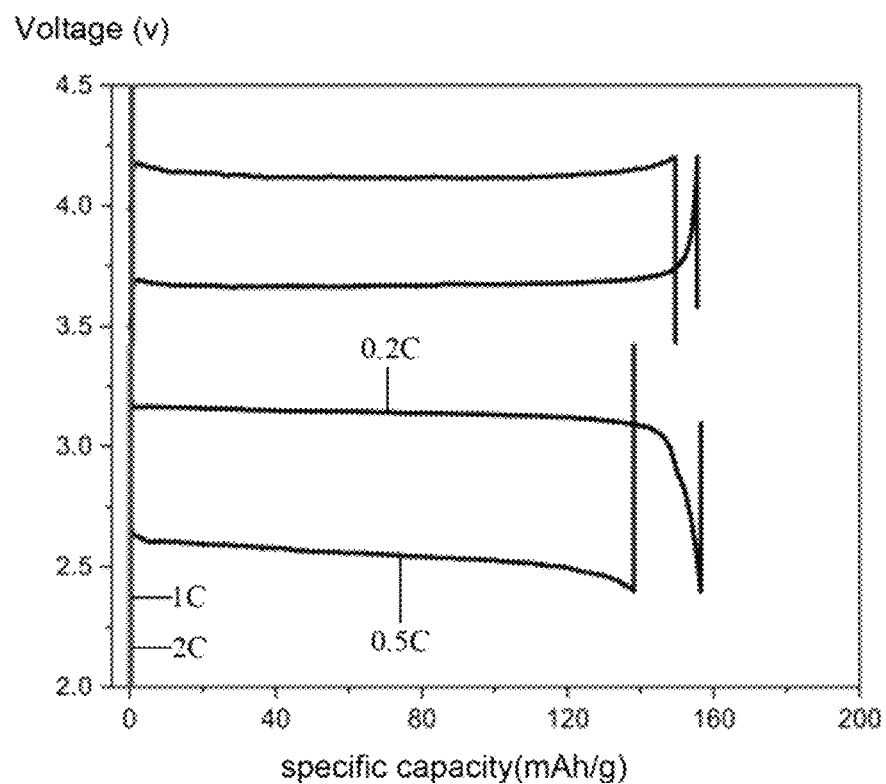
FIG. 11 is the capacity-voltage graph of the positive electrode of the lithium-ion battery of Comparative Example 1 under different rates.

FIG. 10 is a graph showing capacity-voltage curves of the positive electrode of the lithium-ion battery of Example 1 at different rates. FIG. 11 is a graph showing the capacity-voltage curve of the positive electrode of the lithium-ion battery of Comparative Example 1 at different rates. The capacity-voltage curve can more intuitively display an electrode charge and discharge at different rates, and can also explain why the positive electrode of the lithium-ion battery of Comparative Example 1 has no cycle capacity at high rates. As shown in FIG. 10, for the positive electrode of the lithium-ion battery of Example 1, different rates have little effect on a charge and discharge platform, and a polarization of the battery (the difference between a charge platform potential and a discharge platform potential) is also small. Therefore, the positive electrode of the lithium-ion battery of Example 1 still shows excellent cycle performance at high rates. The initial polarization of the positive electrode of the lithium-ion battery of Comparative Example 1 at 0.2 C is relatively large, and when the rate is increased to 0.5 C, the polarization of the lithium-ion battery is further expanded and is close to a cut-off voltage. Therefore, as the cycle progresses or the rate increases, the polarization of the lithium-ion battery will be further increased, resulting in no cycle capacity being released.

Figure 12:
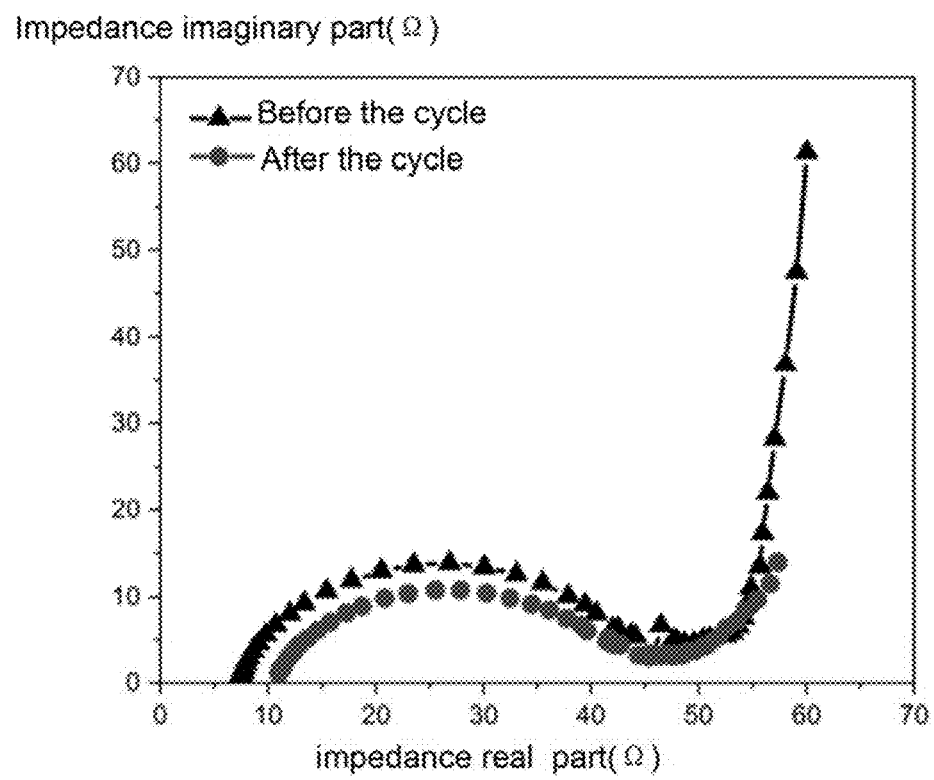
FIG. 12 is a electrochemical impedance (EIS) curves of the positive electrode of the lithium-ion battery of Example 1 before and after cycling.
Figure 13:
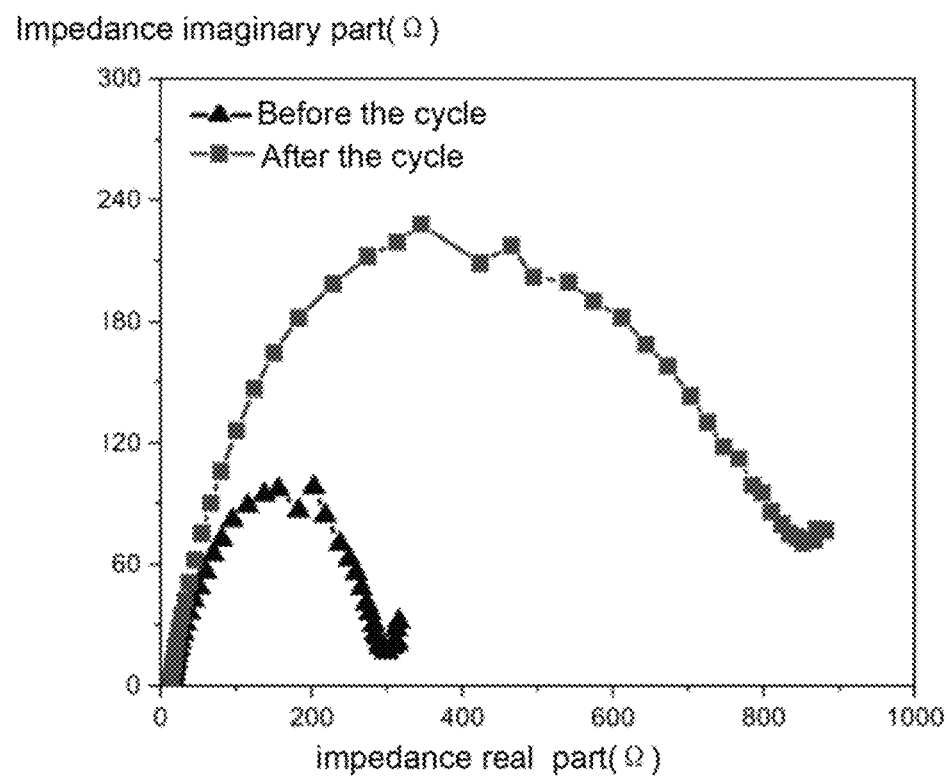
FIG. 13 is the EIS curves of the positive electrode of the lithium-ion battery of Comparative Example 1 before and after cycling.

FIG. 12 is an electrochemical impedance (EIS) curve diagram of the positive electrode of the lithium-ion battery of Example 1 before and after cycling. FIG. 13 is an EIS curve diagram of a lithium-ion battery positive electrode of Comparative Example 1 before and after cycling. The electrochemical impedance (EIS) test can be used to further explain a principle for improving the battery performance of the positive electrode of the lithium-ion battery of Example 1. As shown in FIG. 12, a charge transfer resistance of the positive electrode of the lithium-ion battery of Example 1 before cycling was 39.6Ω, and it is only 34.2Ω after cycling. The size of the charge transfer resistance represents a difficulty of a surface charge transfer of the active material. A low charge transfer resistance of the positive electrode of the lithium-ion battery of Example 1 is due to a network structure of carbon nanotubes in the positive electrode. Because the carbon nanotube network has an excellent conductivity, the carbon nanotube network provides an omnidirectional, multi-site complete conductive network for the active material particles covered and coated on the carbon nanotubes, and a porous structure in the carbon nanotube film can also fully infiltrate an electrolyte, so that lithium-ions can be sufficient transferred in the positive electrode. Therefore, the positive electrode of lithium-ion battery of Example 1 maintains excellent electron and ion transfer capabilities even under high areal loading. The positive electrode of the lithium-ion battery of Example 1 still maintains a smaller charge transfer resistance after cycling, which shows that the positive electrode of the lithium-ion battery of Example 1 has excellent stabile structural.

As shown in FIG. 13, the charge transfer resistance of the positive electrode of the lithium-ion battery of Comparative Example 1 before cycling is as high as 247.9Ω, and the charge transfer resistance is even increased to 893.1Ω after cycling. It can be seen that the electron and ion transfer inside the positive electrode of the lithium-ion battery of Comparative Example 1 under high areal loading is extremely poor. This is because the active material particles of the positive electrode are only in point contact with a small amount of conductive agent in the lithium-ion battery of Comparative Example 1, and when the areal loading increases, the active material particles and the conductive agent particles will agglomerate. In addition, an occurrence of micro-sized cracks indicates that a bonding effect of the binder has deteriorated, which leads to a poor electronic and ion transfer of the lithium-ion battery positive electrode of Comparative Example 1 during the cycle.

Example 3

0.2 g of super-aligned carbon nanotubes and 1 g of NCA powder are ultrasonically dispersed in 600 mL of ethanol for 30 minutes to obtain an electrode mixture. The obtained electrode mixture is sprayed on a 1000 mesh filter screen through a spray gun, and the free-standing lithium-ion battery positive electrode is removed from the filter screen after drying. The above-mentioned lithium-ion battery positive electrode is used as the positive electrode, a polypropylene film is used as a separator, a lithium foil is used as a negative electrode. The positive electrode, the separator, the negative electrode and a stainless steel gaskets are stacked and assembled with CR2016 battery shells to form a button cell. 1M LiPF6 in a mixture of FEC, FEMC and HFE is used as an electrolyte. A mass percentage of the FEC, FEMC and HFE is 2:6:2. The button cell is assembled in a glove box under an argon atmosphere.

Comparative Example 3

An active material NCA, a conductive agent super-p (conductive carbon black) and a binder (PVDF) are mixed in a mass ratio of 8:1:1, and dispersed in the NMP solvent to obtain a slurry. The positive electrode of the lithium-ion battery is formed by coating the slurry on a metal current collector (Al) and drying. A structure of a button battery of Comparative Example 3 is basically the same as that of the button battery of Example 3, except that the above positive electrode is used as the positive electrode of the lithium-ion battery of Comparative Example 3.

Figure 14:
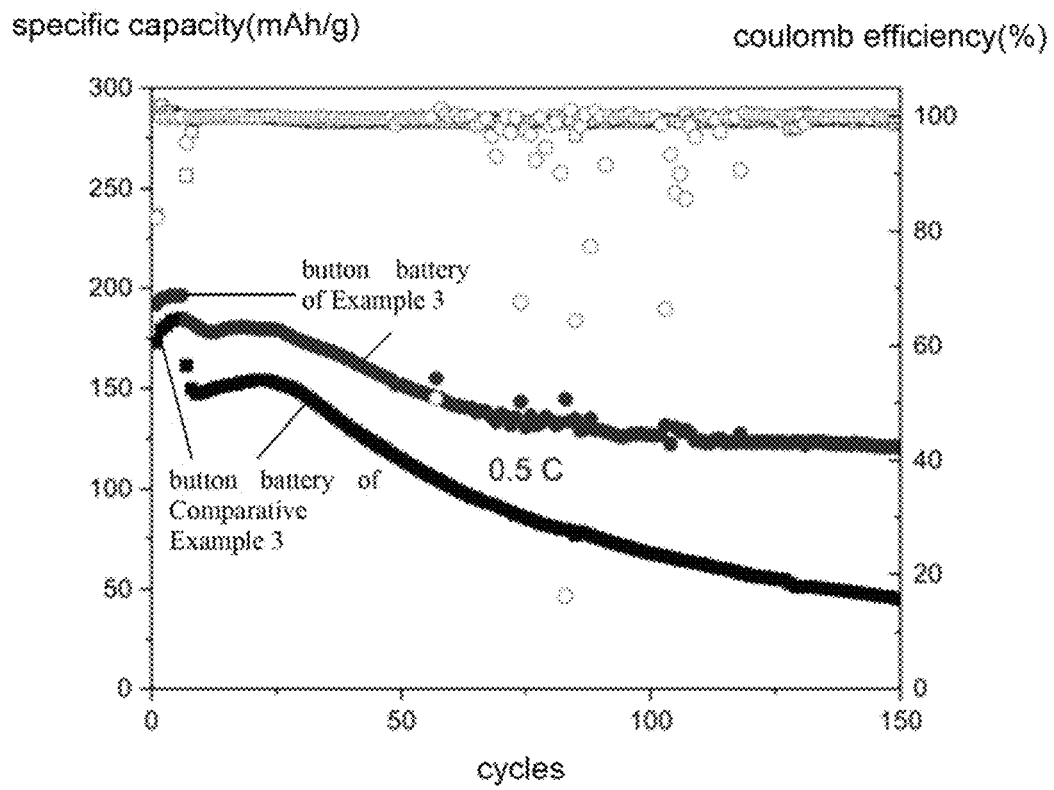
FIG. 14 is the performance comparison graph of the button battery of Example 3 and the button battery of Comparative Example 3 at a rate of 0.5 C.

FIG. 14 is a performance comparison diagram of the button battery of Example 3 and the button battery of Comparative Example 3 at a rate of 0.5 C. As shown in FIG. 14, the button battery of Example 3 has a specific capacity of 120.6 mAh/g after cycling 150 times at a rate of 0.5 C. The button batteries of Comparative Example 3 has a specific capacities of 45.3 mAh/g after cycling 150 times at a rate of 0.5 C. It can be seen that when the active material is NCA, compared with the button battery of Comparative Example 3, the button battery of Example 3 still has good cycle performance.

It can be seen that the method for preparing lithium-ion battery electrode in this present invention can adopt a spraying process to spray different lithium-ion battery active materials to obtain lithium-ion battery positive or negative electrodes, and the formed lithium-ion battery electrode has good cycle performance.

Even though numerous characteristics and advantages of certain inventive embodiments have been set out in the foregoing description, together with details of the structures and functions of the embodiments, the disclosure is illustrative only. Changes can be made in detail, especially in matters of an arrangement of parts, within the principles of the present disclosure to the full extent indicated by the broad general meaning of the terms in which the appended claims are expressed.

Depending on the embodiment, certain of the steps of methods described can be removed, others can be added, and the sequence of steps can be altered. It is also to be understood that the description and the claims drawn to a method can comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure up to, and including the full extent established by the broad general meaning of the terms used in the claims. It will, therefore, be appreciated that the embodiments described above can be modified within the scope of the claims.

What is claimed is:

1. A lithium-ion battery electrode preparation device comprising:
    a rotating device,
    a recycling device fixed on the rotating device and configured to hold an electrode mixture;
    a substrate fixed inside the recycling device, and
    a spray gun located above the substrate, wherein the spray gun configured to spray the electrode mixture on the substrate, wherein the spray gun comprises an air inlet and a liquid inlet, the liquid inlet is connected to one end of a liquid pipe, and another end of the liquid pipe is located in a groove of the recycling device to contact the electrode mixture, the rotating device is configured to support and fix the recycling device so that the recycling device rotates with the rotation of the rotating device and further makes the substrate rotate together.

2. The lithium-ion battery electrode preparation device of claim 1, wherein the substrate is a stainless steel filter screen or a molecular sieve.

3. The lithium-ion battery electrode preparation device of claim 1, wherein the substrate is fixed inside the recycling device through a support.

4. The lithium-ion battery electrode preparation device of claim 1, wherein when the rotating device rotates, a position of the spray gun is kept unchanged.

5. The lithium-ion battery electrode preparation device of claim 1, wherein the liquid pipe is configured to provide an electrode mixture to the spray gun.

6. The lithium-ion battery electrode preparation device of claim 1, wherein the recycling device comprises a groove.

7. The lithium-ion battery electrode preparation device of claim 6, wherein the substrate and at least a part of the support are located in the groove.

8. The lithium-ion battery electrode preparation device of claim 6, wherein the groove is configured to carry the electrode mixture.

9. The lithium-ion battery electrode preparation device of claim 1, wherein a material of the recycling device is glass.

10. The lithium-ion battery electrode preparation device of claim 1, wherein the recycling device has a cylindrical structure.

* * * * *